US012686247B2

(12) United States Patent
Malone

(10) Patent No.: US 12,686,247 B2
(45) Date of Patent: Jul. 21, 2026

(54) PUMP WITH INTEGRATED VALVE AND TEMPERATURE SENSOR AND A THERMAL MANAGEMENT SYSTEM INCLUDING SUCH A PUMP

(71) Applicant: COOPER-STANDARD AUTOMOTIVE INC, Northville, MI (US)

(72) Inventor: David S. Malone, Attica, MI (US)

(73) Assignee: Cooper-Standard Automotive Inc., Northville, MI (US)

( * ) Notice: Subject to any disclaimer, the term of this patent is extended or adjusted under 35 U.S.C. 154(b) by 229 days.

(21) Appl. No.: 17/969,892

(22) Filed: Oct. 20, 2022

(65) Prior Publication Data

US 2024/0131899 A1 Apr. 25, 2024
US 2024/0227502 A9 Jul. 11, 2024

(51) Int. Cl.
B60H 1/00 (2006.01)
F04D 13/06 (2006.01)

(52) U.S. Cl.
CPC ..... B60H 1/00885 (2013.01); B60H 1/00278 (2013.01); B60H 1/00792 (2013.01); F04D 13/06 (2013.01); B60H 2001/00307 (2013.01)

(58) Field of Classification Search
CPC ............ B60H 1/00885; B60H 1/00278; B60H 1/00792; B60H 2001/00307; F04D 13/06
See application file for complete search history.

(56) References Cited

U.S. PATENT DOCUMENTS

| | | | | |
|---|---|---|---|---|
| 4,385,658 | A * | 5/1983 | Leonard ................. | G01K 13/02 |
| | | | | 374/E13.006 |
| 5,046,857 | A | 9/1991 | Metzger et al. | |
| 7,147,369 | B2 | 12/2006 | Gadonniex et al. | |
| 10,164,303 | B2 * | 12/2018 | Marcicki .............. | B60K 7/0007 |
| 10,550,756 | B1 | 2/2020 | Lee | |
| 11,156,146 | B2 * | 10/2021 | Bauer ........................ | F01P 7/16 |
| 11,168,694 | B2 | 11/2021 | Becker et al. | |
| 11,264,656 | B2 * | 3/2022 | Eser .................... | H01M 10/625 |
| 11,761,372 | B2 * | 9/2023 | Jeong .................. | F16K 11/0856 |
| | | | | 62/324.1 |
| 2012/0118988 | A1* | 5/2012 | Lee ........................... | B60L 1/02 |
| | | | | 237/28 |

(Continued)

FOREIGN PATENT DOCUMENTS

CN          115388193  A  *  11/2022  ......... B60H 1/00392

OTHER PUBLICATIONS

CN 115388193 A mt (Year: 2022).*

Primary Examiner — Gordon A Jones
(74) Attorney, Agent, or Firm — Paschall & Associates, LLC; James C. Paschall; Anthony Miologos

(57) ABSTRACT

An apparatus and coolant pump for use in a thermal management system includes a pump housing having an inlet for receiving coolant from the thermal management system and at least first and second outlets extending from the pump housing for directing coolant to at least a first and a second coolant loop. An impeller coupled to an electrical pump motor drives the coolant from the inlet to the first or the second outlet. A valve mounted between the impeller and the first and second outlets selectively directs the flow of coolant through the first or the second outlet. A temperature sensor installed on the pump housing inlet measures the temperature of the coolant entering the coolant pump.

10 Claims, 6 Drawing Sheets

(56) References Cited

U.S. PATENT DOCUMENTS

| 2014/0233606 | A1* | 8/2014 | Nishida | G01K 1/14 |
| | | | | 374/208 |
| 2018/0231167 | A1 | 8/2018 | Wallace et al. | |
| 2020/0072223 | A1* | 3/2020 | Blad | F04D 15/0022 |
| 2020/0072238 | A1* | 3/2020 | Blad | F04D 13/06 |
| 2020/0116161 | A1* | 4/2020 | Blad | F04D 13/06 |
| 2020/0392890 | A1* | 12/2020 | Kellner | F04D 13/06 |
| 2021/0394643 | A1 | 12/2021 | Hall | |
| 2023/0398838 | A1* | 12/2023 | Jung | B60H 1/00278 |
| 2024/0198763 | A1* | 6/2024 | Ok | B60H 1/00278 |

* cited by examiner

PUMP WITH INTEGRATED VALVE AND TEMPERATURE SENSOR AND A THERMAL MANAGEMENT SYSTEM INCLUDING SUCH A PUMP

TECHNICAL FIELD

This disclosure is generally directed towards a vehicle thermal management system. More specifically it is directed towards a pump with integrated valve and temperature sensor and a thermal management system for an electric vehicle using such a pump.

BACKGROUND

Thermal management systems using fluid coolant loops are important to the operation of an electric vehicle. Thermal management systems transfer heat to, from, and/or between the batteries, motors, inverters, and other temperature-sensitive vehicle components and the vehicle's heat exchangers, so as to maintain the temperature of each component (and of the fluid coolant) within operational limits. Pumps are known and commonly used to move fluids, such as coolant in a vehicle. One example is cooling systems with mechanically or electrically driven pumps, which are used for the cooling of different electrical or mechanical components of a vehicle. Valves are used to ensure the distribution of the coolant throughout the thermal management system. The valves each require an actuator with electrical control and a holder on a component of the vehicle, which results in high component costs. Additionally thermal management systems may also employ temperature sensors to measure the temperature of the coolant flowing in the coolant loops in order too properly maintain a temperature set-point for a particular cooling loop, further increasing complexity and component costs.

In some vehicles, more than one cooling loop may be employed to cool/heat generating components and to modulate the temperature of the driver cabin. Each loop requires a pump and a valve to direct flow through the appropriate loop and a temperature sensor for measuring that the temperature set-point for the coolant loop is maintained.

It is an object of the present disclosure to employ a pump with an integrated valve and temperature sensor that can direct the flow of coolant from the pump through a plurality of outlets and also measure the temperature of the coolant entering the pump using a minimal set of components.

SUMMARY

This disclosure relates to an apparatus for cooling a heat generating component of a vehicle. The apparatus includes, a first loop having a component heat exchanger and a chiller module and a second loop having a heater module and a cabin heat exchanger. A first pump having an inlet is attached to the heat exchanger and configured to receive coolant from the heat exchanger. A valve located in the first pump is switched between a chiller mode and a recirculation mode that pumps the coolant from the inlet to the first loop in the chiller mode or between the inlet and the second loop in the recirculation mode. A first temperature sensor installed on the first pump inlet measures the temperature of the coolant entering the first pump. The apparatus further includes a second pump including a valve located in the second pump configured to switch between an isolated mode and a linked mode. The second loop is in downstream communication with the second pump while in the isolated mode, and the first loop in downstream communication with the second pump while in the linked mode. The second pump further includes an inlet in direct downstream communication with the cabin heat exchanger that includes a second temperature sensor installed on the second pump inlet that measures the temperature of the coolant entering the second pump.

This disclosure also relates to a coolant pump for a thermal management system. The coolant pump comprising a pump housing having an inlet for receiving coolant from the thermal management system and at least first and second outlets extending from the pump housing for directing coolant to at least a first and a second coolant loop of the thermal management system. An impeller coupled to an electrical pump motor drives the coolant from the fluid inlet to the first or the second outlet. A valve is mounted between the impeller and the first and second outlets selectively directs the coolant through the first or the second outlets. A temperature sensor installed on the pump housing inlet measures the temperature of the coolant entering the coolant pump from the thermal management system.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

The figures, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
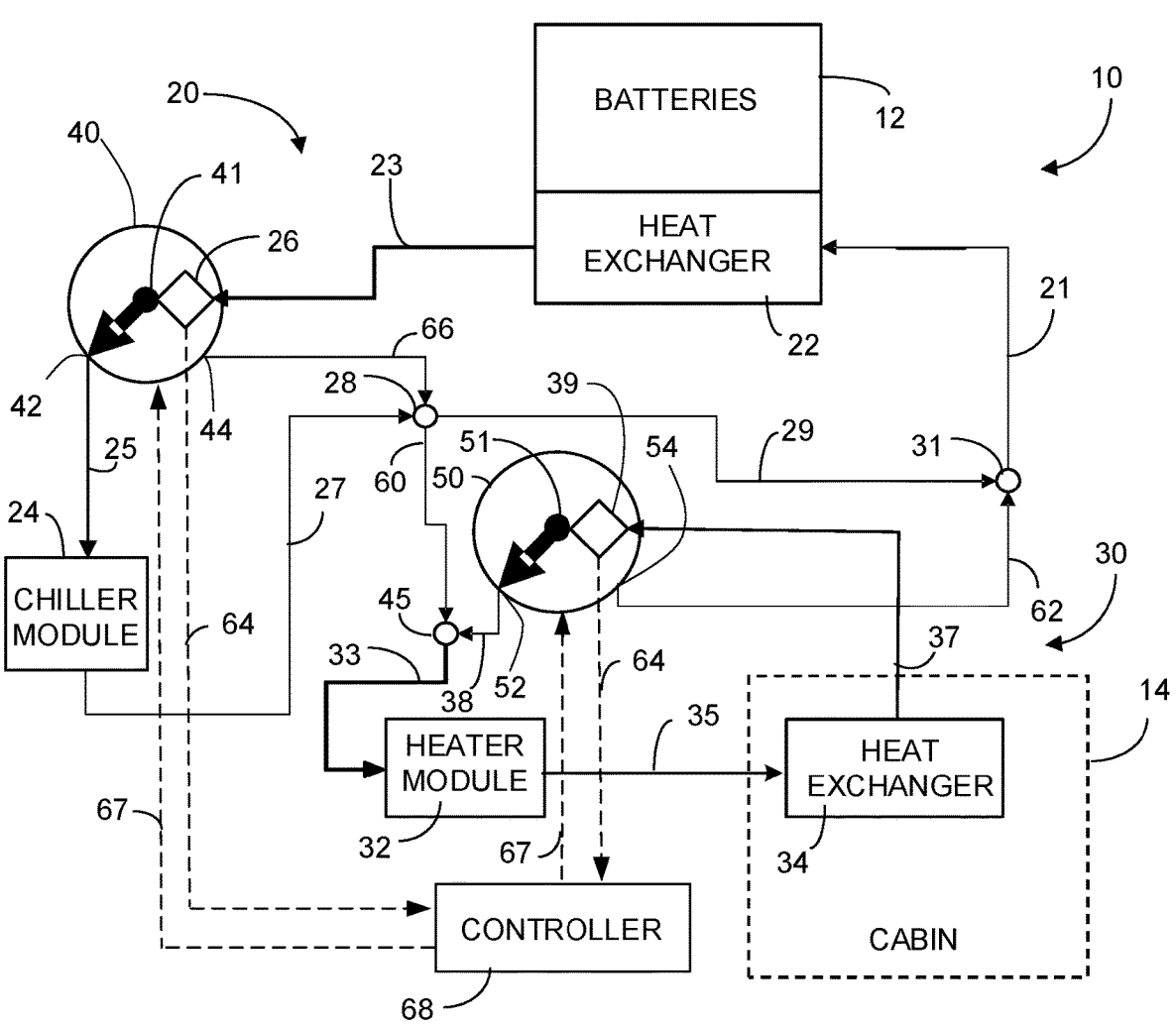
FIG. 1 illustrates a schematic view of a thermal management system of the present disclosure.

FIG. 1 depicts an example thermal management system 10 for regulating the temperature of a heat generating component 12 of a vehicle. The heat generating component 12 may be a battery for powering a hybrid or an electrical vehicle. The thermal management system 10 can also be employed to modulate temperature in a driver cabin 14. The thermal management system 10 may include a first loop 20 and a second loop 30. The thermal management system 10 includes a first pump 40 and a second pump 50. The pumps 40, 50 pump coolant through the loops 20, 30, respectively.

A first loop 20 comprises a component heat exchanger 22 and a chiller module 24. The first loop 20 comprises fluid lines 21, 23 29 and either lines 25 and 27 or line 66. In FIG. 1, the first loop 20 includes lines 25 and 27 instead of line 66. A first fluid line 21 transports coolant to the component heat exchanger 22 to exchange heat with the component thereby heating or cooling the coolant and cooling or heating the heat generating component 12, respectively.

A second fluid line 23 transports coolant to an inlet 41 of a first pump 40 through a first temperature sensor 26 in communication with second line 23. The inlet 41 to the first pump 40 receives coolant from the component heat exchanger 22 because the first pump is in direct downstream communication with the component heat exchanger 22.

The first pump 40 has two outlets and is switchable between two modes, a chiller mode, and a recirculation mode. The first loop 20 is in downstream communication with the first pump 40 while in the chiller mode. When the first pump is in the chiller mode a valve in the first pump 40 opens the first outlet 42 to discharge coolant from the first outlet while the second outlet may be closed 44. The first outlet 42 directs coolant to the first loop 20 through a third line 25 to the chiller module 24. The chiller module 24 may be on or off. When on, the chiller 24 cools the coolant received from the first pump 40 in the third line 25. When off, the chiller module 24 allows the coolant to pass through without cooling. The chiller module 24 may cool the coolant by means of a Peltier electric device. A Peltier electric device applies a current through a junction connecting two metals to absorb heat at the junction to balance the difference in the chemical potential of the two metals to produce a cooling effect.

A second loop 30 comprises a heater module 32 and a cabin heat exchanger 34. The second loop 30 comprises lines 33, 35, 37 and sometimes line 62. In FIG. 1, the second loop 30 includes line 33, 35, 37 instead of line 62. A sixth fluid line 33 transports coolant to the heater module 32. When the heater module 32 is on, it heats coolant passing through the heater module. If the heater module is off, the coolant passes through without heating. The heater module 32 may heat coolant by use of a Seebeck electrical device which operates on the reverse principle as the Peltier electrical device previously described for the chiller module 24. Coolant exits the heater module 32 in a seventh line 35 and passes to the cabin heat exchanger 34.

In the cabin heat exchanger 34 air from the cabin 14 is indirectly heat exchanged with coolant from the seventh line 35. If the heater module 32 is on, the coolant will heat the cabin air. If heater module 32 is off, the first pump 40 is in the chiller mode and the chiller module 24 is on, the coolant will cool the cabin air. Coolant will exit the cabin heat exchanger 34 in eighth fluid line 37 and flow to a second temperature sensor 39 located at the inlet 51 of the pump 50. The inlet 51 to the second pump 50 receives coolant from the cabin heat exchanger 34 because the second pump is in direct downstream communication with the cabin heat exchanger 34.

The second pump 50 has two outlets. The second pump 50 is switchable between an isolated mode and a linked mode. The second loop 30 is in downstream communication with the second pump while in the isolated mode. When the second pump 50 is in the isolated mode a valve in the second pump 50 opens a first outlet 52 to discharge coolant from the first outlet 52 while a second outlet 54 may be closed. The first outlet 52 directs coolant through a ninth line 38 to a third junction 45 from which it flows with any coolant from a first tie line 60 in the second loop 30 through the sixth fluid line 33 back to the heater module 32. In the isolated mode, the second pump 50 only pumps coolant through the second loop 30 via the first outlet 52. Furthermore, in the isolated mode, coolant from the heater module only heats the cabin air through the cabin heat exchanger 34.

When the first pump 40 is in chiller mode and the second pump is in isolated mode, the cooled or uncooled coolant from the chiller module 24 may be transported in a fourth fluid line 27 through a first junction 28 with a first bypass line 66 in the first loop 20 to a fifth line 29 and through a second junction 31 with a second bypass line 62 in the second loop and back through the first line 21 to the component heat exchanger 22 to perhaps cool the heat generating component 12.

When the second pump 50 is in the isolated mode, the first loop 20 and the second loop 30 circulate independently. However, the first loop 20 and the second loop 30 communicate minorly by fluid expansion and contraction through the first tie line 60 which keeps the loops in equilibrium.

The first temperature sensor 26 measures the temperature of the coolant entering inlet 41 of the first pump 40. The measurement readings from temperature sensor 26 determines the positioning of the valve outlets 42, 44 settings and a coolant flow rate from the valve outlet that is switched on to reach a desired temperature. The first temperature sensor 26 may send signals to a controller 68 via communication line 64 for signaling the first pump 40. The controller intern determines the pumped mode and a flow rate and actuates via communication line 67 the outlets 42, 44 to a desired mode.

For example, based on the measurement readings from the first temperature sensor 26 the valve of the first pump 40 may be put into a recirculation mode and the second pump 50 into the linked mode. In the recirculation mode the pump 40 valve opens a second outlet 44 to direct coolant to the second loop 30 and may close the first outlet 42. The first pump 40 pumps coolant through the second outlet 44 in the first bypass line 66 through the first junction 28 and by the way of least resistance through the first tie line 60 through the second junction 45 along with coolant pumped from the second pump 50 in line 38 and is fed in line 33 to the heater module 32, through line 35 and then to the cabin heat exchanger 34. The coolant exits the cabin heat exchanger 34 in line 37 and is fed to the inlet 51 of the second pump 50. Coolant in the first bypass line 66 only minorly travels through the fifth line 29 in the first loop 20. In recirculation mode, the first pump just recirculates coolant in the first loop 20 bypassing the chiller module 24.

In the linked mode, the valve on the second pump 50 opens to the second outlet 54 and closes first outlet 52. Second outlet 54 directs coolant through a second bypass line 62. The second bypass line 62 feeds a second junction 31 and along with coolant from the fifth line 29 flows in first line 21 to the component heat exchanger 22 in the first loop 20. In the linked mode, coolant from the first loop 20 only minorly joins coolant from the second loop 30 at the second junction 31 from line 29 and flow together to the component heat exchanger 22 in line 21. The coolant in the first loop 20 and the second loop 30 circulate dependently. The coolant from the first bypass line 66 is pumped through the first junction 28 and through the first tie line 60 and the second junction 45 into the second loop 30. In the second loop 30, the coolant is pumped through the line 33 into the heater module 32 to be heated if the heater module is on then through the line 35 and into the cabin heat exchanger 34 to modulate heat in the cabin 14.

The second temperature sensor 39 measures the temperature of the coolant exiting the cabin heat exchanger 34. The measurement readings from the second temperature sensor 39 determines the positioning of valve outlets 52, 54 settings and a coolant flow rate from the valve outlet that is switched on for the pump 50 required to reach a desired temperature. The second temperature sensor 39 sends signals to the controller 68 via communication line 64 for signaling the second pump 50. In turn the controller 68 determines the pump mode and flow rate.

For example, based on the measurement readings from temperature sensor 39 the first pump 40 may be retained in the chiller mode and the second pump 50 positioned in the linked mode. In the linked mode, the first loop 20 is in downstream communication with the second pump 50. In linked mode, the coolant in the first loop 20 and the second loop 30 circulate dependently. In the chiller mode the valve in pump 40 opens outlet 42 and closes outlet 44 to flow coolant flows through the first loop 20.

In the linked mode, the valve on the second pump 50 opens to the second outlet 54 which directs coolant to the second loop 30 through a second bypass line 62. The valve closing the first outlet 52. The second pump in linked mode pumps coolant from the second outlet 54 through the second bypass line 62 to a second junction 31 and along with minor coolant from the fifth line 29 flows in the first line 21 to the component heat exchanger 22 in the first loop 20. In linked mode, the second pump 50 pumps coolant from the second pump from the second loop 30 into the first loop 20. In linked mode, minor coolant from the first loop 20 and coolant from the second loop 30 meet at the second junction 31 and flow together to the component heat exchanger 22 in line 21.

Figure 2:
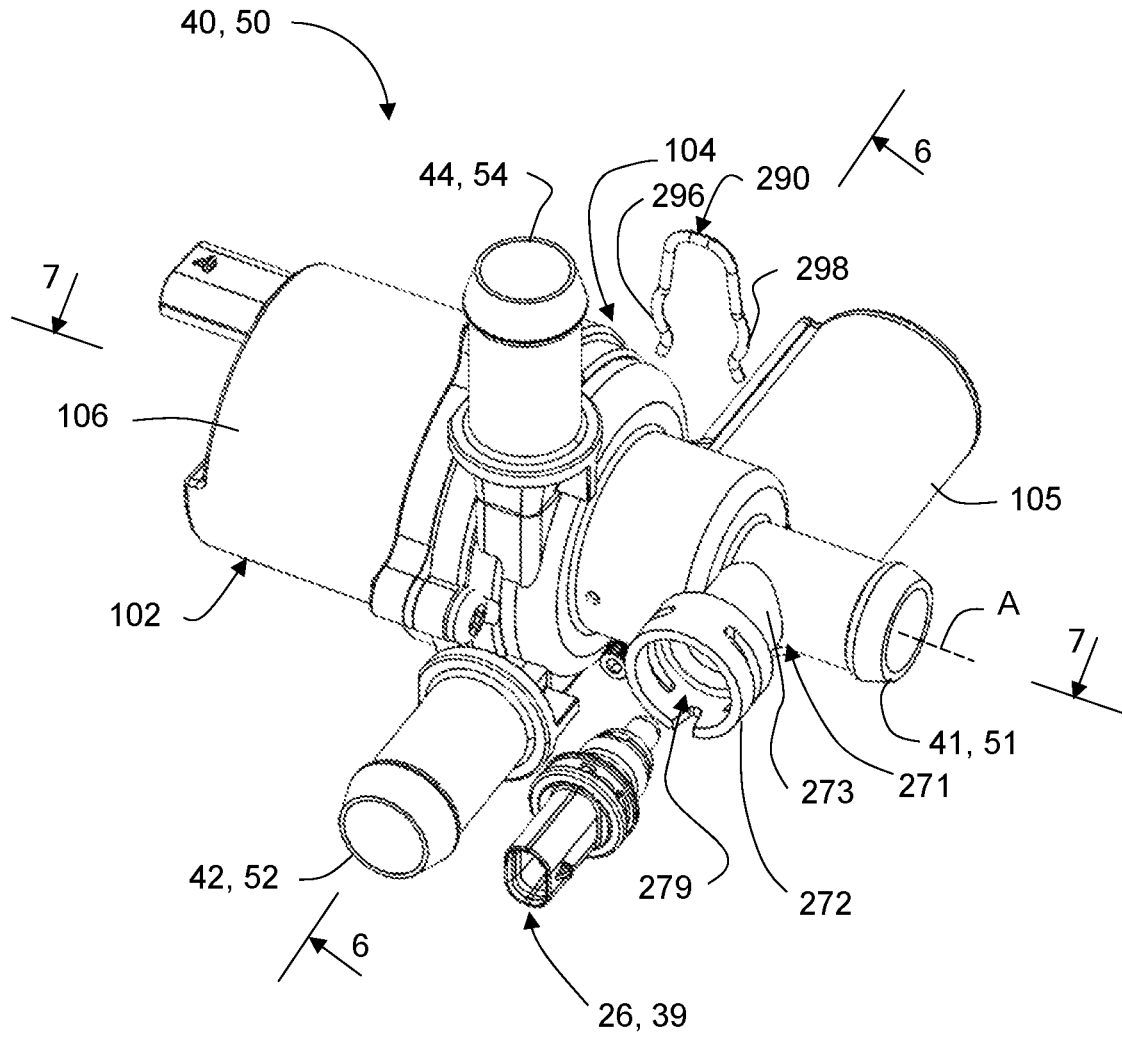
FIG. 2 illustrates a perspective view of a pump of the present disclosure.

FIG. 2 illustrates an example of a first pump 40 and a second pump 50 for pumping the coolant in a vehicle. As can be appreciated, the pump 40, 50 may also be used in non-vehicle applications. The pump 40, 50 is an integration of a pump, a valve for selectively controlling flow from the pump and a temperature sensor for measuring the temperature of the coolant entering the pump 40, 50. The pump 40, 50 includes a pump motor section 102, and a pump section 104. The pump motor section 102 is encased in a motor housing 106.

Figure 3:
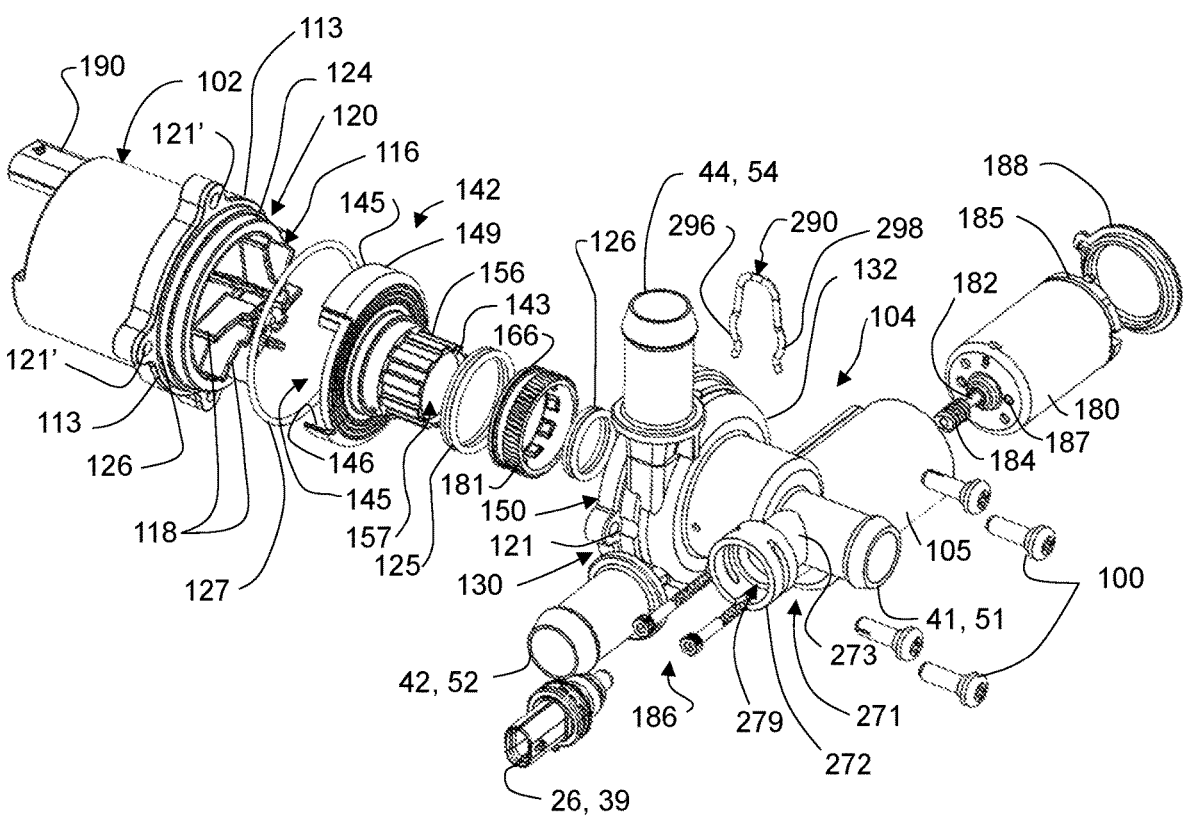
FIG. 3 illustrates an exploded perspective view of the pump of the present disclosure.

With additional reference to FIG. 3 the pump motor section 102 contains a pump motor (not shown) and a motor shaft installed through an opening of a pump motor mounting plate 113. The pump motor drives an impeller 116 to move the coolant. The impeller 116 includes a plurality of impeller vanes 118 for moving the coolant through the pump. The impeller 116 is configured to be rotatable within the pump section 104 driven by the motor shaft 112. The pump motor includes electrical connection 190 adapted to receive electrical power and control signals from the controller 68 to energize and operate the pump motor. The flow rate of coolant pumped from the pump 40, 50 can be controlled by increasing or decreasing the motor RPM using the electrical power and/or control signals from the controller 68

The pump motor mounting plate 113 isolates the motor assembly from the coolant pumped by the pump section 104. The mounting plate 113 includes a first surface extending from a flange portion 120 having an elastomeric sealing element, such as for example an O-ring 124 installed in a groove on the first surface. The mounting plate 113 further includes a second surface perpendicular to the first surface which includes a groove 126 extending along the outer periphery of second surface 125. An elastomeric sealing element, such as for example an O-ring 127 is arranged to be installed in groove 126.

The pump section 104 also includes a flange 130 having a plurality of fastener tabs and unthreaded holes 121 located through each tab in alignment with the tabs and threaded holes 121' of the mounting plate 113. The pump section 104 is assembled to motor section 102 by aligning mounting plate 113 and flange 130 and drawing the pump section 104 to motor section 102 and. The first and second surfaces of the mounting plate 113 circumferentially engages an inner complimentary surface of the pump housing 132, with the O-rings 124 and 127 sealing the motor section 102 to the pump section and housing 32. The motor section 102 is secured to the pump section 104 using suitable threaded fasteners 100. The threaded fasteners 100 pass through holes 120 to be screwed into threaded holes 120' of the of the mounting plate 118. As can be appreciated, other types of fastening devices or techniques may be used to secure the pump section 104 to the motor section 102.

As illustrated in FIGS. 2 and 3, the pump section 104 includes a cylindrical pump housing having a peripheral exterior wall 132. The pump inlet 41, 51 for example a suction inlet for receiving a coolant is positioned centrally to the rotary axis of the pump housing. The pump housing also includes the first outlet 42, 52 and the second outlet 44, 54 for discharging coolant from the pump section 104. The first outlet 42. 52 and the second outlet 44. 54 extend from the pump housing wall 132 and are axially offset from each other such that the centers of the outlets in the example, are oriented 90 degrees from the other. It will be appreciated by those skilled in the art, that outlets 42, 52 and 44, 54 may be offset from each other at any other convenient angle. Both the first 42, 52 and the second outlet 44, 54 are in open communication with a pump cavity 150.

Figure 4:
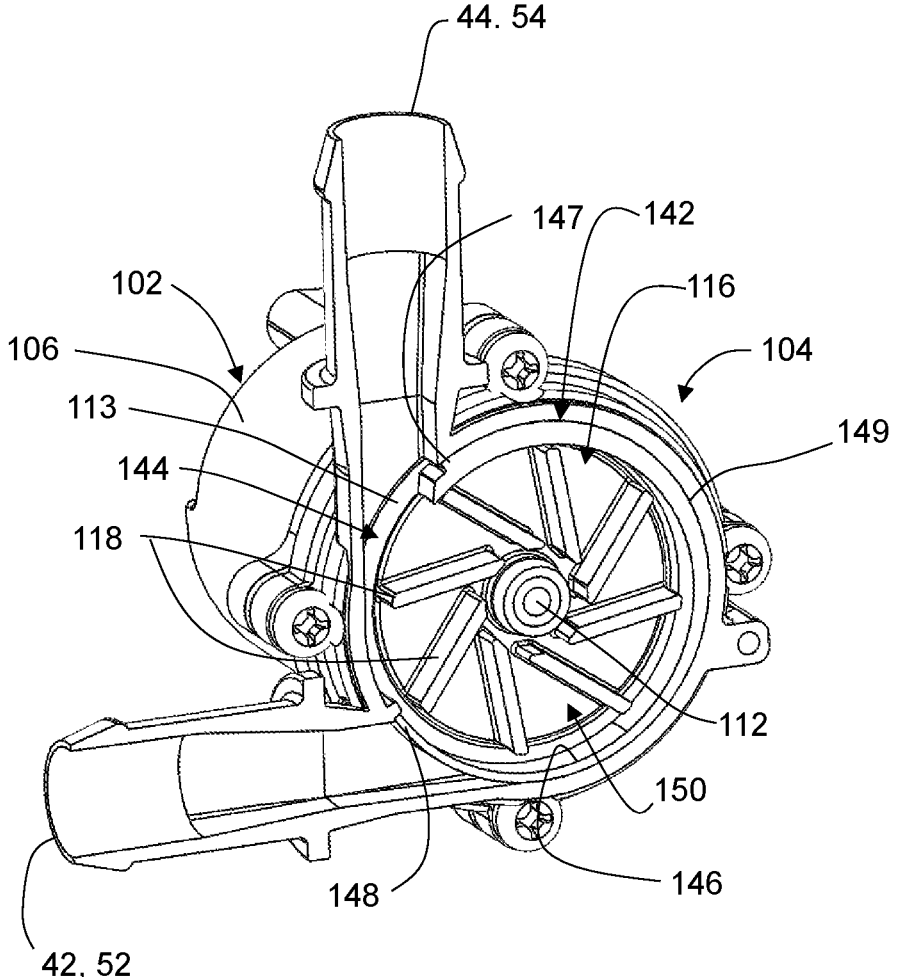
FIG. 4 illustrates a sectional view through the valve of the pump of FIG. 2 taken at segment 6-6 of the present disclosure.

With renewed reference to FIGS. 3 and 4 an example adjustable valve 142 of the present disclosure is illustrated. FIG. 4 depicts a cross-sectional perspective view of the pump section 104 taken at segment 6-6 of FIG. 2. The first outlet 42, 52 and second outlet 54, 54 are in downstream communication with a pump cavity 150. The adjustable valve member 142 is radially located outside the impeller 116 and inside the pump cavity 150. The valve 142 is arranged to adjustably direct the coolant through the respective first outlet 42, 52 or second outlet 44, 54. The adjustable valve 142 has an annular wall 145 with an exterior wall surface 149 and an interior wall surface 146 and an opening 144 extending through wall 145. In this example, wall 145 of the valve 142 is spirally voluted from a generally thicker wall section at a first end 147 of opening 144 to a generally thinner wall section at a second end 148 of the opening 144. The impeller 116 is arranged to rotate inside the annular wall 145 and particularly the voluted interior wall surface 146. In operation, rotation of the adjustable valve 142 by actuator 180 selectively positions opening 144 to divert the flow of coolant from the pump cavity 150 to the first outlet 42, 52 or the second outlet 44, 54 thereby controlling the discharge of coolant from the pump section 104.

In FIG. 3 the adjustable valve 142 is shown to include a cylindrical inlet member 143 located at an upper section of valve 142. The upper section includes an annular outer surface 156 and an internal passage 157 having an annular interior surface. The outer surface 156 is adapted to accept an exterior sealing assembly 125 on outer surface 156 circumferentially about the perimeter of outer surface 156. The internal passage 157 interior surface is adapted to accept an interior sealing assembly 126 circumferentially therein. The interior sealing assembly 126 is located parallel with and directly opposite from the exterior sealing assembly 125. The exterior and interior sealing assemblies are used to provide a fluid tight seal between the valve 142 and the valve housing.

The upper section 143 of the adjustable valve 142 further includes an actuation ring 166 having a spline tooth gear band 181 adapted to be attached about the periphery of the outer surface 156 of upper section 143. The teeth of the gear band 181 are arranged to be mechanically engaged to a worm gear member 184 attached to a shaft 182 of an actuator motor 180. The adjustable valve 142 is rotatable about a central axis A to switch the flow of coolant from the pump cavity 150 to the first or the second outlets. The actuator motor 180 is housed within the actuator motor housing 105 of the pump section 104. The actuator motor 180 is electrically connected to controller 86 through an electrical circuit section 185 on a rear face of the actuator motor 180 using an electrical connector (not shown). The controller 68 providing control signal that selectively drive actuator motor 180 to rotate worm gear 184 and causing rotation of the valve 142. Actuator motor 180 is secured to actuator motor housing 105 using fasteners 186 that engage threaded holes 187 located on a front face of actuator motor 180 and a rear cover plate 188 is installed over electrical section 185. As was explained above, rotation of the adjustable valve 142 selectively positions opening 44 to switch the flow of coolant from the pump cavity 150 to either the first outlet 42, 52 or the second outlet 44, 54 thereby controlling the discharge of coolant from the pump section 104.

As illustrated in FIGS. 2 and 3, pump section 104 inlet 41, 51 includes a sensor receptacle 271 integrally formed to inlet 41, 51. The sensor receptacle 271 is adapted to receive a temperature sensor 26, 39 within an annular cavity 279 formed in the interior of the sensor receptacle 271. A sensing tip 216 is arranged to extend through a hole 274 made in a wall 84 of inlet 41, 51 exposing the sensing tip 216 to the coolant flowing in inlet 41, 51.

Figure 5:
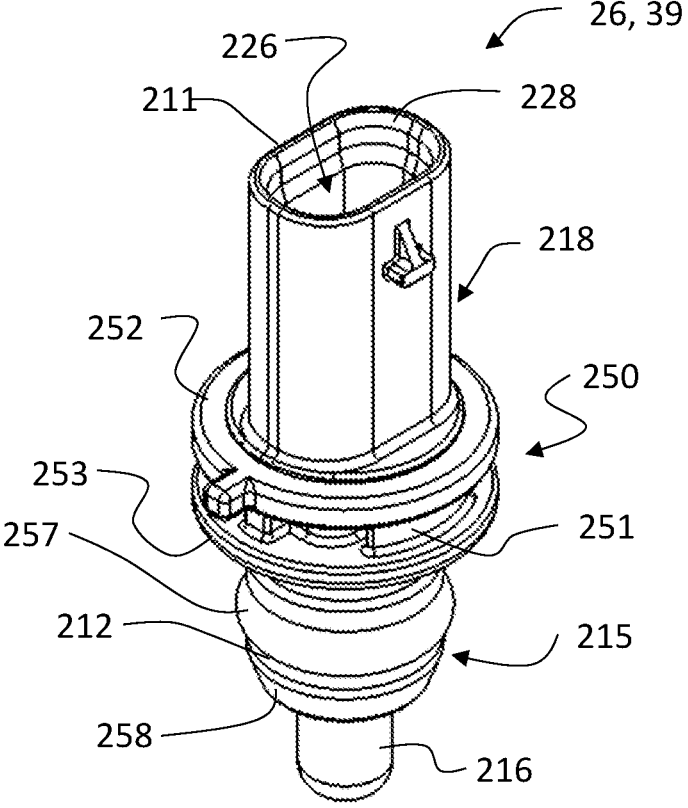
FIG. 5 illustrates a perspective view of the temperature sensor of the present disclosure.

FIG. 5 illustrate an example temperature sensor 26, 39 of the present embodiment. The temperature sensor 26, 39 includes a liquid resistant, non-metallic housing 211, a sensor portion 215 that includes the sensor tip 216 located at the end of the housing 211 opposite a connector portion 218. The entire housing 211 is formed using an appropriate thermoplastic material applicable to withstand the chemical compositions and temperatures that the thermal probe 10 will be exposed to, such as for example, a polyethersulfone material infused with glass fibers. In the case of a coolant sensor for an internal combustion engine, the main design criteria is that the housing 11 provide adequate chemical resistance to ethylene-glycol mixtures which are used in engine coolants. Other materials having the characteristics of polyethersulfone, such as polyphthalimde, may also be used to form the housing 211. Synthetic polymers or poly-amides such as nylon 6 or nylon 6,6 may be used to form the housing 211 in water based, or low-temperature coolants typically used in battery cooling applications for electric vehicles.

The sensor portion 215 of the housing 211 includes a mounting assembly, seen generally at 250, used to secure the temperature sensor 26, 39 in the sensor receptacle 271. The mounting assembly is comprised of an upper flange member 252 and a lower flange member 253 defining an annular channel 251 therebetween. The channel 251 cooperates with a suitable locking clip 290, shown in FIGS. 2, 3 and 5 to retain the temperature sensor 26, 39 in the sensor receptacle 271. An outer surface 212 of the sensor portion 215 includes a first sealing element 257 located circumferentially about the outer surface 212 of the housing 211. A spacer-cap 258 is locked on the outer surface 212 of the housing below the first sealing element 257 and functions as a bore pilot to properly position the sealing element 257 within receptacle 271.

The exemplary housing 211 is formed in one-piece using an injection molding process that forms both the sensor portion 215 and connector portion 218 as a unitary structure. The housing 211 includes an interior chamber 226 adapted to have a temperature sensing assembly inserted into and secured within the interior chamber 226. The interior chamber 226 extends inward into the housing 211 from an opening 228 through a connector cavity 227 of the connector portion 218 to a sensor cavity 224 at the sensor portion 215.

Figure 6:
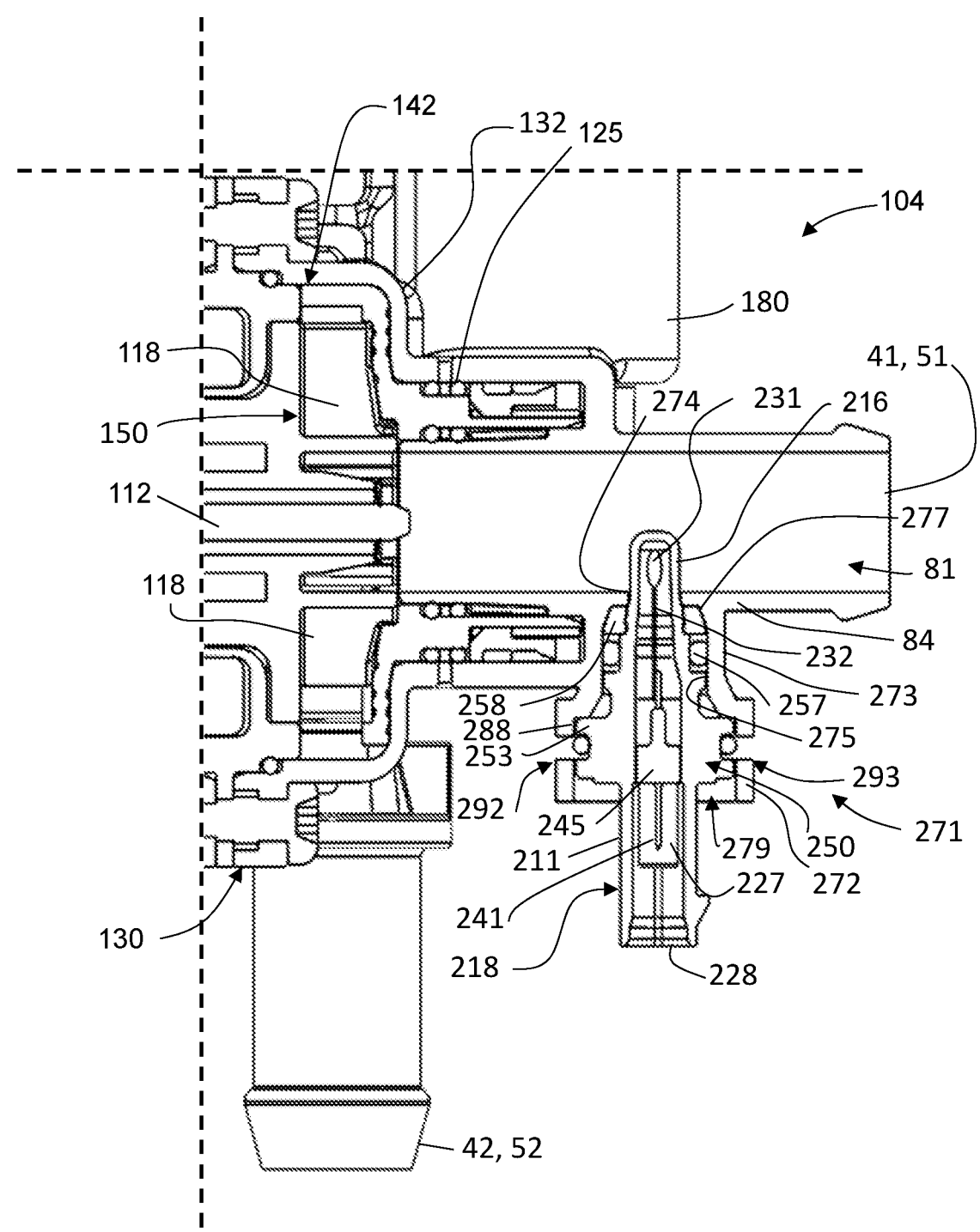
FIG. 6 illustrates a sectional view through a section of the pump of FIG. 2 taken at segment 7-7 of the present disclosure.

FIG. 6 depicts a cross-sectional view of the pump section 104 taken at segment 7-7 of FIG. 2. As illustrated in FIG. 6, the temperature sensing assembly is comprised of a temperature sensing device 231, electrical leads 232, a terminal base 245 and a connector assembly comprised of electrical terminals 241. The temperature sensing device 231 is arranged to have a parameter which varies with temperature. Preferably, the temperature sensing device 231 is in the form of a thermistor having an electrical resistance which varies with temperature. However, it should be understood that other suitable devices such as a negative temperature coefficient [NTC] device, a positive temperature coefficient (PTC) device, a thermocouple or a semiconductor device could be used to perform the function of the temperature sensing device 231 without departing from the scope of the invention. A pair of electrical leads 232 (only one shown in the section illustrated) extend from sensing device 231. The pair of electrical leads 232 are in turn attached to a pair of electrical terminals 241 (only one shown) of the connector assembly respectively, using any suitable means that makes a good mechanical and electrical connection between the leads 232 and the terminals 241.

Terminals 241 extend through the terminal base 245 from an end facing the temperature sensing device 231 to an end facing connector opening 228. The terminals 241 extend into connector cavity 227 of the connector portion 218 of housing 211. The connector cavity 227 is arranged to accept a suitable terminal connector (not shown) through connector opening 228 to electrically connect the temperature sensitive assembly to an external controller, such as controller 68 in FIG. 1. Electrical terminals 241 form a circuit for transmitting changes in electrical current representing the temperature sensed by temperature sensing device 231. The circuit formed by terminals 241 transmit the current changes as an output signal via communication line 64 to the controller 68.

With reference to FIGS. 2, 3 and 6 the sensor receptacle 271 of the present disclosure will be described. The sensor receptacle 271 is formed on a wall 84 forming inlet 41, 51. A cylindrical passage 81 formed by wall 84 extends through inlet 41, 51 leading to pump cavity 150. The sensor receptacle 271 includes a generally cylindrical top hat portion 272 extending from a generally cylindrical bottom portion 273 that is integrally attached to wall 84. The interior cavity 279 extends through receptacle 271 from the top hat 272 through the bottom portion 273 and to the hole 274. Hole 274 extends through the wall 84 of inlet 41, 51 and into passage 81. The sealing element 257 has a diameter slightly larger than an interior surface 275 of interior cavity 279 arranged to elastically deform against interior surface 275. A ring-shaped bearing surface 277 is arranged to receive the spacer-cap 258 to pilot the sensor tip 216 to hole 274 and properly position the sealing element 257 to the perimeter of interior wall 275. With spacer-cap 258 installed on the bearing surface 277 the sealing element 257 is centrally positioned within interior cavity 279 equidistant to the perimeter of interior surface 275. This aids in properly positioning the sealing element 257 to make a uniform fluid tight seal circumferentially about the sealing element 257 and the interior surface 275. The hole 274 is sized to receive the thermal sensor tip 216 therethrough and allow the sensor tip 216 of housing 211 to extend into passage 81.

An interior surface of top hat portion 272 is annularly shaped and sized to accept therein the mounting assembly 250 of the temperature sensor 26, 39. An annular shoulder 288 is formed within the interior surface of top hat portion 272 arranged to have a bottom surface of the lower flange 253 rest on shoulder 288. First and second slots 292, 293 extend through an exterior wall 294 of top hat portion 272. Slot 292 is adapted to receive therethrough a leg 296 of locking clip 290 and slot 293 a leg 298 of the locking clip. Each leg 296, 298 extending through its respective slot 292, 293 to be accepted within channel 251 of the mounting assembly 250. The locking clip 290 locks the thermal probe within sensor receptacle 271 preventing the temperature sensor 26, 39 from being removed from the sensor receptacle 271.

With the temperature sensor 26, 39 installed in the interior cavity 279, the sensor tip 216 extends into the coolant flowing in passage 81 to allow the temperature sensing device 231 to provide a reading of the coolant's temperature as was explained above. The connector portion 218 extends outward from the top hat portion 272, allowing the connector portion 218 to accept a suitable terminal connector (not shown) onto connector opening 228 to electrically connect the electrical terminals 241, to communication line 64 and controller 68.

The temperature sensor 26, 39 may be removed from the probe receptacle 271 by backing out the clip 290 and each leg 296, 298 from channel 251 and slots 292, 293 of the top hat portion 272 allowing the temperature sensor 26, 39 to be pulled out of the interior cavity 279.

It may be advantageous to set forth definitions of certain words and phrases used throughout this patent document. The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," or "controller" within a claim is understood and intended to refer to structures known to those skilled in the relevant art, as further modified or enhanced by the features of the claims themselves and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus for cooling a heat generating component of a vehicle, comprising:
   a first loop comprising a component heat exchanger and a chiller module;
   a second loop comprising a heater module and a cabin heat exchanger;
   a first pump arranged to provide adjustable flow rates having an inlet attached to the heat exchanger configured to receive coolant from the heat exchanger;
   a valve located in the first pump configured to switch between a chiller mode and a recirculation mode, the first pump pumping the coolant from the inlet to the first loop in the chiller mode or between the inlet and the second loop in the recirculation mode; and
   a second pump arranged to provide adjustable flow rates;
   a valve located in the second pump configured to switch between an isolated mode and a linked mode, the second loop in downstream communication with the second pump while in the isolated mode, and the first loop in downstream communication with the second pump while in the linked mode; and
   a first temperature sensor installed on the first pump inlet that measures the temperature of the coolant entering the first pump, wherein the first temperature sensor signals a controller that operates the valve into the chiller mode or the recirculation mode and adjusts the flow rate of the first pump.

2. The apparatus of claim 1, wherein the first pump has a first outlet and the valve directs the coolant to the first outlet and the first loop in the chiller mode and the first pump has a second outlet and the valve directs the coolant to the second outlet and the second loop in the recirculation mode.

3. The apparatus of claim 1, wherein the second pump has a first outlet and the valve directs the coolant to the first outlet and the second loop in the linked mode and the second pump has a second outlet and the valve directs the coolant to the second outlet and the first loop in the isolated mode.

4. The apparatus of claim 1, wherein the second pump includes an inlet in direct downstream communication with the cabin heat exchanger and a second temperature sensor is installed on the second pump inlet that measures the temperature of the coolant entering the second pump.

5. The apparatus of claim 1, wherein responsive to the first temperature sensor signaling the controller, the controller places the first pump valve in the chiller mode when the temperature of the coolant at the first pump is higher than a set point and to place the first pump valve in the recirculation mode when the temperature of the coolant entering the first pump is lower than a set point.

6. The apparatus of claim 4, wherein the second temperature sensor is arranged to signal the controller, the controller placing the second pump valve in the linked mode when the temperature of the coolant at the second pump is above a set point and to place the second pump valve in isolated mode when the temperature of the coolant entering the cabin heat exchanger is below a set point and adjust the flow rate of the second pump.

7. The apparatus of claim 5, wherein the first pump includes an actuator mechanically connected to the valve and electrically connected to the controller, wherein the controller signals the actuator to operate and switch the valve between the chiller mode and the recirculation mode.

8. The apparatus of claim 6, wherein the second pump includes an actuator mechanically connected to the valve and electrically connected to the controller, wherein the controller signals the actuator to operate and switch the valve between the linked mode and the isolated mode.

9. The apparatus of claim 2, wherein the first pump includes an electrical motor connected to an impeller located inside the valve, the impeller arranged to rotate within the valve and drive the coolant through a valve opening to the first outlet in the chiller mode or to the second outlet in the recirculation mode.

10. The apparatus of claim 3, wherein the second pump includes an electrical pump motor connected to an impeller located inside the valve, the impeller arranged to rotate within the valved and drive the coolant through a valve opening to the first outlet in the linked mode or the second outlet in the isolation mode.

* * * * *